United States Patent [19]
Mazziotti

[11] Patent Number: 5,342,240
[45] Date of Patent: Aug. 30, 1994

[54] HIGH CAPACITY UNIVERSAL JOINT

[75] Inventor: Philip J. Mazziotti, Toledo, Ohio

[73] Assignee: The Zeller Corporation, Defiance, Ohio

[21] Appl. No.: 569,847

[22] Filed: Aug. 20, 1990

Related U.S. Application Data

[63] Continuation of Ser. No. 378,835, Jul. 12, 1989, abandoned.

[51] Int. Cl.5 ............................................. F16D 3/41
[52] U.S. Cl. ........................................ 464/11; 464/136
[58] Field of Search ............ 464/11, 14, 128, 130–132, 464/136; 384/127, 474, 486, 548

[56] References Cited

U.S. PATENT DOCUMENTS

| | | | |
|---|---|---|---|
| 1,333,988 | 3/1920 | Mattingly | 464/136 |
| 1,989,832 | 2/1935 | Swenson | 464/130 |
| 2,020,253 | 11/1935 | Braun | 464/130 |
| 4,312,547 | 1/1982 | Negele et al. | 384/486 |
| 4,505,689 | 3/1985 | Mazziotti | 464/130 |
| 4,530,675 | 7/1985 | Mazziotti | 464/131 |
| 4,834,691 | 5/1989 | Schultze et al. | 464/131 |

FOREIGN PATENT DOCUMENTS

| | | | |
|---|---|---|---|
| 1267478 | 3/1968 | Fed. Rep. of Germany | 464/14 |
| 2144401 | 3/1973 | Fed. Rep. of Germany | 384/486 |
| 55-54722 | 4/1980 | Japan | 464/14 |
| 59-166717 | 9/1984 | Japan | 464/130 |
| 691079 | 5/1953 | United Kingdom | 464/14 |

*Primary Examiner*—Daniel P. Stodola
*Attorney, Agent, or Firm*—Allen D. Gutchess, Jr.

[57] ABSTRACT

A high capacity universal joint has a larger cross with larger bearings surfaces. The cross has a heavier main body with four legs, the diameters of which are larger than those of a standard cross used with yokes of a given size. The cross can also have longer trunnions to provide larger bearing surfaces. The yokes have two arms with bores and with locating surfaces adjacent the bores. The cups for races can be deeper and extend beyond outer surfaces of the arms with the cups having recessed locating surfaces in coplanar relationship with the yoke locating surfaces and held in position by machine screws. Closed ends of the cups have lubricating fittings with standpipes extending into recesses in the ends of the trunnions. Two rows of bearings separated by an annular ring are located between the trunnions and the cups, and seals in the open ends of the cups urge the bearings toward the closed ends thereof.

3 Claims, 1 Drawing Sheet

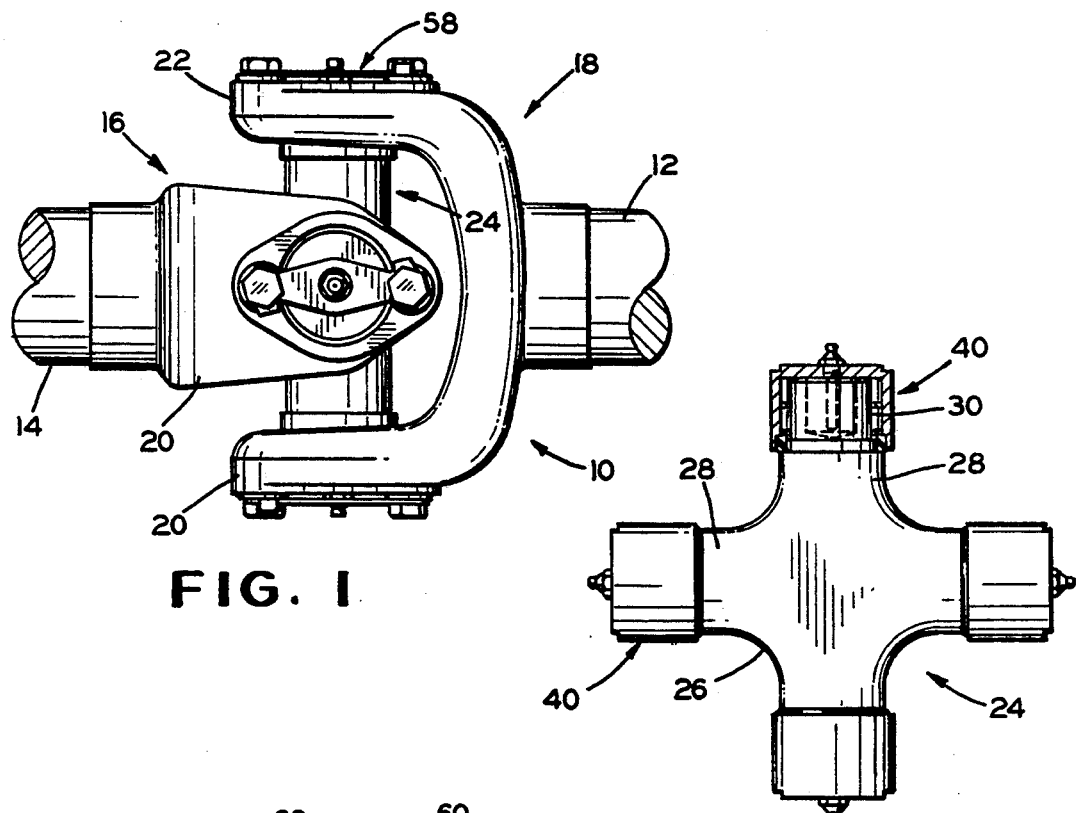
FIG. 1
FIG. 2
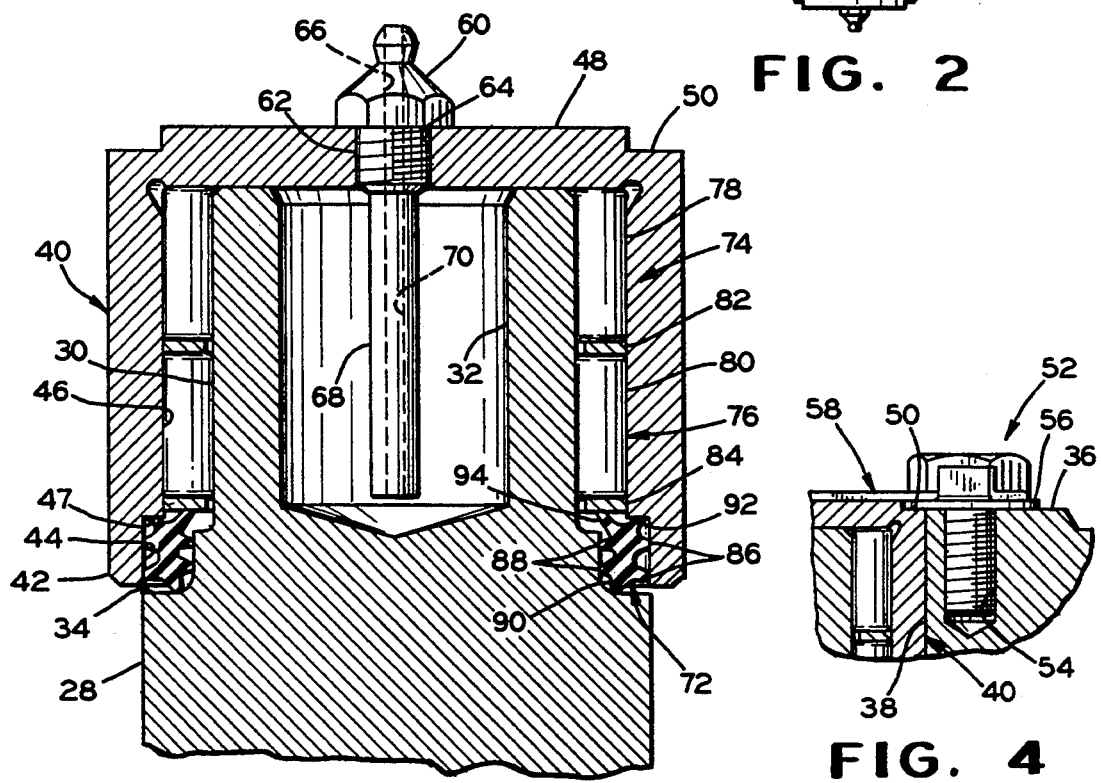
FIG. 3
FIG. 4

HIGH CAPACITY UNIVERSAL JOINT

This application is a continuation of my co-pending application, Ser. No. 378,835, filed on Jul. 12, 1989, now abandoned.

This invention relates to a high capacity universal joint.

A universal joint in accordance with the invention is designed to last longer than present production universal joints by using longer trunnions and a bearing construction that provides more life at the same load than has been achieved by production products. Basically, the invention provides an interchangeable, longer-life universal joint. The new cross and bearing assembly can be substituted for a standard journal cross and fit into the same standard universal joint yokes. The standard yoke arms have locating surfaces on the outer surfaces thereof adjacent the bores that receive the bearing cups. The bearing cups have recessed locating surfaces in their closed ends which are in coplanar relationship with the locating surfaces of the yoke arms when the cups are assembled therewith and held by suitable fasteners. This enables the closed ends of the cups to project outwardly beyond the outer surfaces of the yoke arms to provide a greater distance between the cups in each pair of the yoke arms. Thus, the trunnions of the cross can be longer for a given size joint and the cups can be deeper to provide the larger bearing surfaces.

Because the cross is larger and heavier for the same size yoke arms, the cross cannot be provided with the usual lubricating fittings located between the trunnions in the body thereof. Consequently, the closed end of each cup is provided with a lubricant fitting centrally located therein for external lubrication. A standpipe or tube extends inwardly from the closed end of the cup and into a large recess in the end of the cross trunnion. This directs lubricant from the fitting into the closed end of the recess and forces lubricant out between the trunnion and the bearing cup through the seal to provide full and proper lubricant in the joint.

With the longer trunnions and deeper cups, two annular rows of roller or needle bearings are preferably employed between the trunnion surface and the inner surface of the cup. These are separated by an annular partition or washer. The outer end of the cup has an annular, resilient seal having a resilient lip extending toward the closed end of the cup and engaging an outer retainer or washer which, in turn, engages the ends of the adjacent row of bearings, thereby urging the bearings toward the closed end of the cup to retain them in proper position.

It is therefore, a principal object of the invention to provide a high capacity, long-life universal joint.

Another object of the invention is to provide a higher capacity, long-life universal joint using yokes of a given, standard size.

A further object of the invention is to provide a universal joint having a cross with longer trunnions and deeper bearing cups to fit a universal joint having yoke arms of predetermined size.

Many other objects and advantages of the invention will be apparent from the following detailed description of preferred embodiments thereof, reference being made to the accompanying drawings, in which:

FIG. 1 is a somewhat schematic view in elevation of a universal joint embodying the invention;

FIG. 2 is a view in elevation, with parts broken away and with parts in cross section, of a cross and bearing cups of the universal joint of FIG. 1;

FIG. 3 is a greatly enlarged view in transverse, fragmentary cross section of a bearing cup and trunnion shown in FIG. 2; and FIG. 4 is an enlarged, fragmentary, cross-sectional view of a portion of a yoke arm and bearing cup with mounting components.

Referring to the drawings, and more particularly to FIG. 1, a universal joint in accordance with the invention is indicated at 10 and connects drive and driven members 12 and 14 in the usual manner. The universal joint includes two yokes 16 and 18 disposed at mutually perpendicular angles, each having arms 20 and 22.

A larger cross 24 is located between the pairs of arms of the yokes. In FIG. 2, the cross has a heavier body 26 with legs 28 extending therefrom. The diameters of the legs are proportional relative to the effective stress to which the cross is subjected to produce the heaviest possible cross body within the space limitations of the yokes and the ability of the cross to be assembled with the yokes of the joint.

Referring to FIGS. 2 and 3, the legs terminate in trunnions 30 which also can be longer than the trunnions of conventional crosses. The outer ends of the trunnions 30 have deep recesses 32 therein to receive and retain lubricant. Shoulders 34 are formed on the legs 28 between the legs and the trunnions 30.

Each of the yoke arms 20 and 22 has a locating surface 36 as shown in FIG. 4 machined thereon adjacent, and in this instance surrounding, a bore 38 therein which receives a bearing cup 40. Each of the bearing cups 40 has an open end 42 as shown in FIG. 3 to receive the trunnion 30, with the cup having a first cylindrical inner portion 44 of one diameter adjacent the open end 42 and a second cylindrical internal portion 46 of smaller diameter away from the open end. An internal annular shoulder 47 is formed between the two portions 44 and 46 and faces the open end 42.

The cup 40 has a closed end 48 with recessed locating surfaces 50 in the periphery. When the cup 40 is mounted in the bore 38 of the yoke arm 20 or 22, the recessed locating surfaces 50 are in coplanar relationship with the arm locating surfaces 36 (FIG. 4). The cup 40 is held in this position by threaded fasteners or machine screws 52 which are threaded into tapped bores 54 adjacent the cup bore 38 and extend through annular retaining rings or washers 56 which form planar locating surfaces in contact with the cup locating surfaces 50 and the arm locating surfaces 36 to maintain them in the coplanar relationship. With this arrangement, the closed end 48 of the cup 40 extends beyond the outer surfaces of the yoke arm 20 or 22 so that the outer ends of the cups 40 in opposite yoke arms are positioned farther apart. This enables the cups 40 to be deeper, with the wider annular internal surfaces 46 to provide greater bearing surfaces to match the larger bearing surfaces of the trunnions 30. A locking plate 58 can extend across the closed end of the cups 40 and engage the heads of the machine screws 52 to prevent them from turning, as in known in the art.

The closed end 48 of each of the bearing cups 40 has a Zerk or lubricant fitting 60 affixed thereto. The fitting 60 has a threaded shank 62 received in a tapped hole 64 of the cup and has a lubricant passage 66 extending therethrough. A standpipe or tube 68 is affixed to the closed end of the cup and has a lubricant passage 70 communicating with the passage 66. The tube 68 extends near the inner end of the trunnion recess 32 so as to direct lubricant to this portion of the recess. The lubricant is then forced out around the tube 68 and between the end of the trunnion 30 and the inner surface of the closed end 48 of the cup where it passes between the bearing surfaces of the trunnion and the cup. Some of the lubricant can then be forced out past an annular resilient seal 72 located in the open end 42 of the cup 40. The tube or standpipe arrangement for the lubricant substantially eliminates the possibility of air pockets forming within the cup 40 and interfering with proper lubrication.

The lubricant fittings 60 are provided in the outer ends of the cups 40 in place of the more common lubricant fitting which is usually mounted in the body 26 of the cross 24. Because of the heavier and larger size of the cross 24, the lubricant fitting for the cross would not have room between the yoke arms 20 and 22 of the yokes 16 and 18.

With the longer trunnions 30 and the deeper bearing cup 40 providing the larger bearing surfaces, two rows 74 and 76 of needle or roller bearings 78 and 80 are preferably employed in place of a single row of bearings. The rows 74 and 76 are separated by an annular partition or washer 82. An outer annular retainer or washer 84 is also employed at the outer ends of the bearings 80 in the row 76.

The bearing cup seal 72 has outwardly-extending, narrow circular lips 86 which engage the cylindrical portion 44 of the cup 40 and has inwardly-extending, narrow circular lips 88 which engage a portion of the cross leg 28. The seal 72 also has oppositely extending lips 90 and 92 which engage the shoulders 34 and 47 of the cross and cup, respectively. The lips hold the seal 72 in proper position as well as providing additional narrow sealing areas for the cup. Further, the seal 72 has an additional lip 94 which engages the outer surface of the annular retainer 84 and urges the bearings 78 and 80 toward the closed end of the cup to provide guidance and retain them properly in position. Thus, the seal 72 not only functions as a seal but also as a resilient retaining member for the bearings, providing guidance and eliminating the need for an extra spring washer or the like to serve this purpose.

From the above, it will be seen that the invention provides a universal joint with a heavier cross and larger bearing surfaces which enable the joint to have a higher capacity and a longer life.

Various modifications of the above-described embodiments of the invention will be apparent to those skilled in the art and it is to be understood that such modifications can be made without departing from the scope of the invention, if they are within the spirit and tenor of the accompanying claims.

I claim:

1. A universal joint comprising a cross, four cups, and two yokes, said cross having a main body and four legs extending outwardly therefrom and terminating in four trunnions of one diameter, each of said trunnions having a central, deep recess in an outer end thereof, said legs having cylindrical portions at the inner ends of said trunnions of a larger diameter than said one diameter, each of said cups having at least one recessed locating surface in a peripheral portion of a closed end of said cup, said cup having a first cylindrical inner portion of one diameter adjacent an open end and a second cylindrical portion of smaller diameter away from the open end, with an annular internal shoulder formed between said two portions and facing the open end, each of said yokes having two arms, each with a bore therethrough, an outer surface of each of said arms having a locating surface adjacent the corresponding bore, a lubricant fitting affixed to a central portion of the closed end of each of said cups and having a lubricant passage extending therethrough, a standpipe extending through a substantial portion of said deep recess and terminating short of the inner end thereof, said standpipe being substantially smaller in transverse cross section than said deep recess, and having a central passage communicating with said lubricant passage, two rows of roller bearings between each of said cups and the corresponding trunnion, an annular separator between said rows of bearings, an annular retainer adjacent the row of bearings closer to the open end of the cup, a resilient seal in said first cylindrical portion, said seal having thin lips engaging said cup and said cross and having a larger resilient lip extending toward and into contact with said retainer to urge said rows of bearings toward the closed end of the cup, said cylindrical portion of each of said legs being positioned to contact said resilient seal, and fastener means holding said cups in said yoke arms with said recessed locating surfaces of the cups in coplanar relationship with the locating surfaces of said yoke arms.

2. A universal joint according to claim 1 wherein said resilient seal has at least three thin lips engaging said cup and at least three thin lips engaging said cross.

3. A universal joint according to claim 1 wherein each of said lubricant fittings has a threaded shank and the closed end of each of said cups has a threaded hole to receive the threaded shank to affix said lubricant fitting to the closed end.

* * * * *